US008279255B2

(12) United States Patent
Hansson (10) Patent No.: US 8,279,255 B2
(45) Date of Patent: Oct. 2, 2012

(54) ELECTRONIC EQUIPMENT FOR A COMMUNICATION SYSTEM

(75) Inventor: Emil Hansson, Melmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1129 days.

(21) Appl. No.: 11/915,028

(22) PCT Filed: May 16, 2006

(86) PCT No.: PCT/EP2006/004615
§ 371 (c)(1),
(2), (4) Date: Jun. 30, 2008

(87) PCT Pub. No.: WO2006/125551
PCT Pub. Date: Nov. 30, 2006

(65) Prior Publication Data
US 2008/0303888 A1    Dec. 11, 2008

Related U.S. Application Data

(60) Provisional application No. 60/686,372, filed on Jun. 1, 2005.

(30) Foreign Application Priority Data

May 23, 2005    (EP) .................................... 05011120

(51) Int. Cl.
*H04N 7/14* (2006.01)
(52) U.S. Cl. ............... 348/14.02; 348/14.01; 348/14.12; 379/90.01
(58) Field of Classification Search .... 348/14.01–14.16; 379/90.01, 93.09, 93.14
See application file for complete search history.

(56) References Cited

U.S. PATENT DOCUMENTS

| 6,515,695 B1* | 2/2003 | Sato et al. .................. 348/14.08 |
| 7,185,054 B1* | 2/2007 | Ludwig et al. ................ 709/204 |
| 2003/0025786 A1* | 2/2003 | Norsworthy ............... 348/14.08 |
| 2003/0071890 A1* | 4/2003 | McClure ................... 348/14.03 |

FOREIGN PATENT DOCUMENTS

WO    02/37848    5/2002

OTHER PUBLICATIONS

International Search Report and Written Opinion for corresponding Application No. PCT/EP2006/004615 dated Aug. 21, 2006.

* cited by examiner

*Primary Examiner* — Melur Ramakrishnaiah
(74) *Attorney, Agent, or Firm* — Renner, Otto, Boisselle & Sklar, LLP (57) ABSTRACT

The present invention relates to a method and an electronic equipment for reducing the set-up time required to establish video calls between handheld communication devices, wherein the method comprises the steps of detecting (16, S1) a signal to establish a video call via a communication link, determining (16, 30) the party to which the video call has to be established, searching, in a data base (30), for information indicating the capability of the party with respect to the video call, defining, for the electronic equipment (1), specifications for the video call based on the information, and initialling the electronic equipment (1) according to the specifications. By storing the negotiated result of a previous video call between communication devices, no further negotiation is necessary in the following video calls. The calling device can start its camera (8) and load its codecs during the calling phase and the called device can do it after receiving the set-up message from the network.

9 Claims, 6 Drawing Sheets

ELECTRONIC EQUIPMENT FOR A COMMUNICATION SYSTEM

This application is a §371 of International Application No. PCT/EP2006/004615 filed on May 16, 2006, which claims benefit to U.S. Provisional Application No. 60/686,372 filed on Jun. 1, 2005, and also claims priority to European Application No. 05011120.2 filed on May 23, 2005.

TECHNICAL FIELD OF THE INVENTION

The present invention relates to a method and an electronic equipment for a communication system enabling multimedia telecommunication. In particular, it relates to a mechanism for reducing the set-up time required to establish video calls between handheld communication devices.

DESCRIPTION OF RELATED ART

Mobile phone systems are offering more and more advanced multimedia capabilities, including games and videos, and there will be a continuing demand for increasingly powerful and sophisticated multimedia functions in the future. One application that is expanding is the incorporation of videophone functions in 3G mobile phone systems. Generally, before media transmission between terminals of a wireless communication system is started procedures to establish media transmission and to synchronize the terminals have to be executed. When, for example, a video call is set up between two handheld communication devices the first step is the negotiation phase after the call is accepted. The purpose of this phase is to reach compatibility, e.g. determining what type of video and audio formats etc. is suitable for both devices. Today, in the fastest mobile telephones and networks these steps take approximately five seconds.

US 2004/0174817 A1 discloses a method for reducing the time required to establish calls of multimedia telecommunication between multimedia handsets of a mobile telecommunication network which follow the 3GPP's (Third Generation Partnership Projects) 3G-324M standard that is a version of ITU-T's (International Telecommunications Union) H.324 Recommendation adapted for mobile devices, wherein the document addresses the delay in 3G-324M call set-up time caused by multiple H.245 message transmissions in several protocol layers, many of which require an acknowledgement before the transmission of the next message. A single round-trip of a message in a 3G-324M connection typically requires 800 milliseconds or more. On the other hand, call set-up typically requires transmitting ten H.245 messages to establish media transmission resulting in a set-up time of up to eight seconds (not including the initial set-up time of the 3G call connection itself). This is long even without taking into account errors on the network.

The US 2004/0174817 A1 proposes a concentration of H.245 messages so the number of standard SRP/NSRP (Simple Retransmission Protocol/Numbered Simple Retransmission Protocol) command messages is reduced, an incorporation of H.245 Non-Standard messaging capabilities to incorporate information about the equipment involved in the call so that the number of H.245 and SRP/NSRP message exchanges is minimized, and an incorporation of equipment preferences information in the call signaling protocol exchange as to eliminate the need for further information exchange between the equipment in order to start media communication following call signaling.

Figure 1:
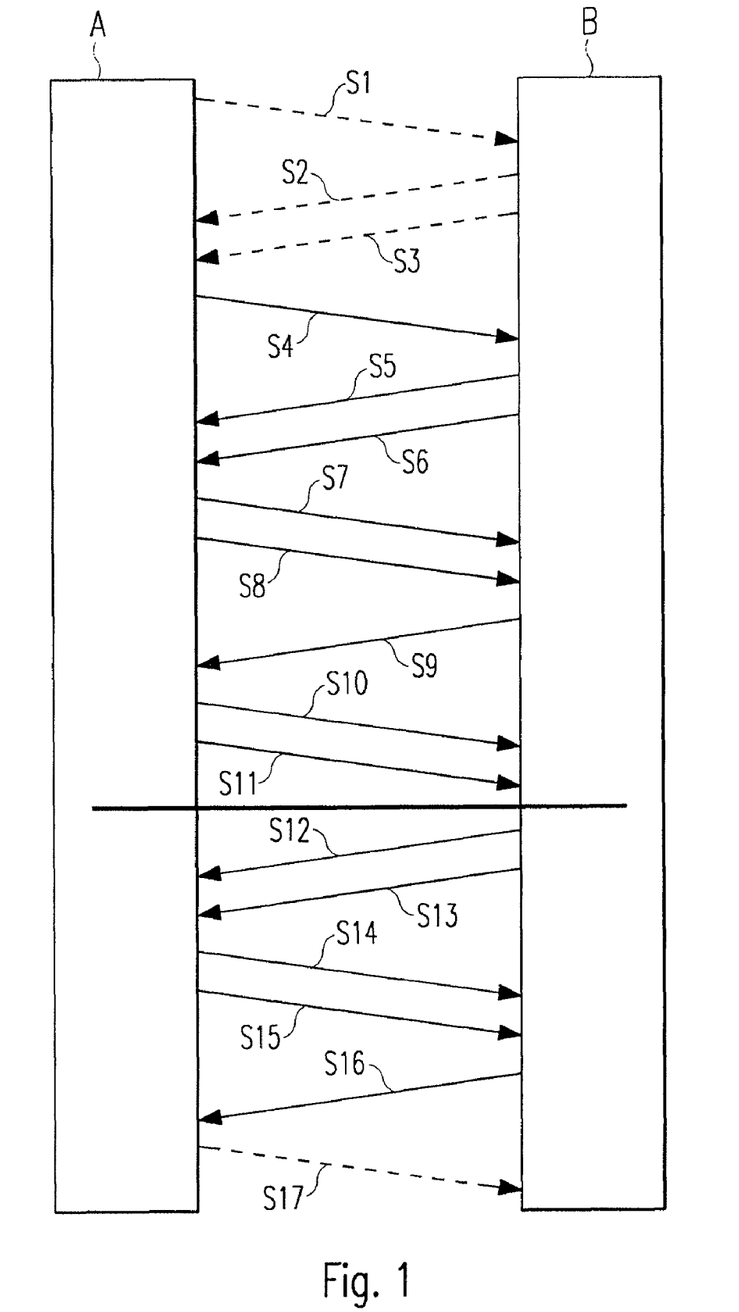
FIG. 1 shows a signal diagram illustrating a set-up for a video call between two mobile phones according to the prior art.

A typical sequence of steps for a video call set-up is shown in FIG. 1, wherein network messages are indicated by the dotted line, H.245 messages are indicated by the thin line and the time when the codecs are loaded is indicated by the thick line. In Step S1 the originating terminal A initiates the call set-up procedure by sending a SETUP message including parameter values. The SETUP message informs the called terminal B of the incoming call. In Step S2 terminal B sends an ALERTING message and terminal A is informed that ringing has started. When the called terminal B answers a CONNECT message is sent from the terminal B to terminal A in step 3.

In step S4 terminal A sends a TerminalCapabilitySet message which lists the audio and video codecs and other capabilities that the terminal A supports, and describes which modes of operation and algorithm options are supported within the relevant audio or video standard. In steps S5 and S6 terminal B sends a TerminalCapabilitySetAcknowledge message to confirm receipt of the TerminalCapabilitySet and its TerminalCapabilitySet message, respectively. Whereupon terminal A sends a TerminalCapabilitySetAcknowledge in step S7. In step S8 information for Master Slave determination procedure which allows terminals A, B to determine which terminal is the master and which terminal is the slave is sent from the terminal A. An Acknowledge message is sent from terminal B in step S9. In steps S10 and S11 a msDetConfirmn message indicating the result of the master slave determination procedure and that the result of the procedure is known at both terminals A, B, and a Request for opening the logical channels are sent from the terminal A, respectively. As indicated by the thick line, in terminal A and B codecs can be loaded now.

An Acknowledge message for the opening of logical channels and a Request message for opening the logical channels are sent also from the terminal B in steps S12 and S13, respectively. An Acknowledge message for the opening of logical channels and a endSession command indicating the end of the H.245 session are sent from terminal A in steps S14 and S15, respectively. Whereupon terminal A sends an endSession command in step S16. In step S17 a ReleaseComplete message for Releasing the call is sent form terminal A.

As shown in FIG. 1, after the video call is answered in step S3, the H.245 negotiation phase is started where the terminals A and B agree on what capabilities, supported by both terminals, which will be used during the video call session. After an agreement is reached in step S11 the specific audio and video codecs can be loaded, the audio and video channels can be set-up and the actual video call can be considered started.

The negotiation and the loading of codecs is time consuming. The fastest phones still consume about 5 seconds after the call is accepted until video is transmitted in both directions. This time is something most major operators would like to see decline. For the end user this time might appear frustrating especially if you call someone spontaneous in order to show something. The negotiation time will probably be even more annoying when a user switches from a voice call to a video call. On the other hand, the end user has to pay for nothing during this phase since there is no way to communicate neither by audio or video.

SUMMARY

It is an object of the present invention to provide an electronic equipment for a communication system and a method for an electronic equipment which enable to reduce the time required to start a video call.

This object is achieved by an electronic equipment for a communication system and a method for an electronic equipment according to the enclosed independent claims. Advantageous features of the present invention are defined in the corresponding subclaims.

According to the present invention the method for an electronic equipment comprises the steps of detecting a signal to establish a video call via a communication link, determining the party to which the video call has to be established, searching, in a data base, for information indicating the capability of the party with respect to the video call, defining, for the electronic equipment, specifications for the video call based on the information, and initialling the electronic equipment according to the specifications.

The method can be executed by a calling communication device and by a called communication device, wherein in the called communication device the signal to establish the video call is the set-up message from the network. In the determining step, the subscriber number of the calling communication device and the subscriber number of the called communication device are determined in the called communication device and in the calling communication device, receptively.

With the present invention, by storing the negotiated result of a previous video call between communication devices, no further negotiation is necessary in the following video calls between the communication devices. The calling device can start its camera and load its codecs during the calling phase and the called device can do it after receiving the set-up message from the network.

According to the present invention the electronic equipment comprises means for detecting a signal to establish a video call via a communication link, means for determining the party to which the video call has to be established, means for searching, in a data base, for information indicating the capability of the party with respect to the video call, means for defining, for the electronic equipment, specifications for the video call based on the information; and means for initialling the electronic equipment according to the specifications.

Advantageously the electronic equipment further comprises means for updating the data base, wherein the data base includes a list of recipient data with respect to previous communications, which indicates recipient addresses, transmission methods and types of the transmitted information content.

Further, advantageously the electronic equipment further comprises means for acquiring recipient data from an other communication device, wherein the updating means updates the data base based on the acquired recipient data.

Preferably the communication system is a wireless communication system, wherein the electronic equipment is a mobile phone. However, it should be noted that the electronic equipment can be any kind of handheld communication device like as pagers, personal digital assistants, handset or electronic organizers etc.

It should be emphasised that the term "comprises/comprising" when used in the specification is taken to specify the presence of stated features, integers, steps or components but does not preclude the presence or edition of one or more other features, integers, steps, components or groups thereof.

In context of the present application and the present invention, the term "electronic equipment for a wireless communication system" includes any kind of portable radio communication equipment. The term "portable radio communication equipment" includes all equipment's such as mobile telephones, mobile cell-phones, pagers, personal digital assistants, communicators, i.e. electronic organisers, smart phones or the like. The term "wireless communication system" relates to any kind of communication or tele-communication system which enables the wireless transfer of information.

BRIEF DESCRIPTION OF THE DRAWINGS

Embodiments of the invention will now be described by way of example only with reference to the accompanying drawings, in which.

DETAILED DESCRIPTION OF EMBODIMENT

Figure 2:
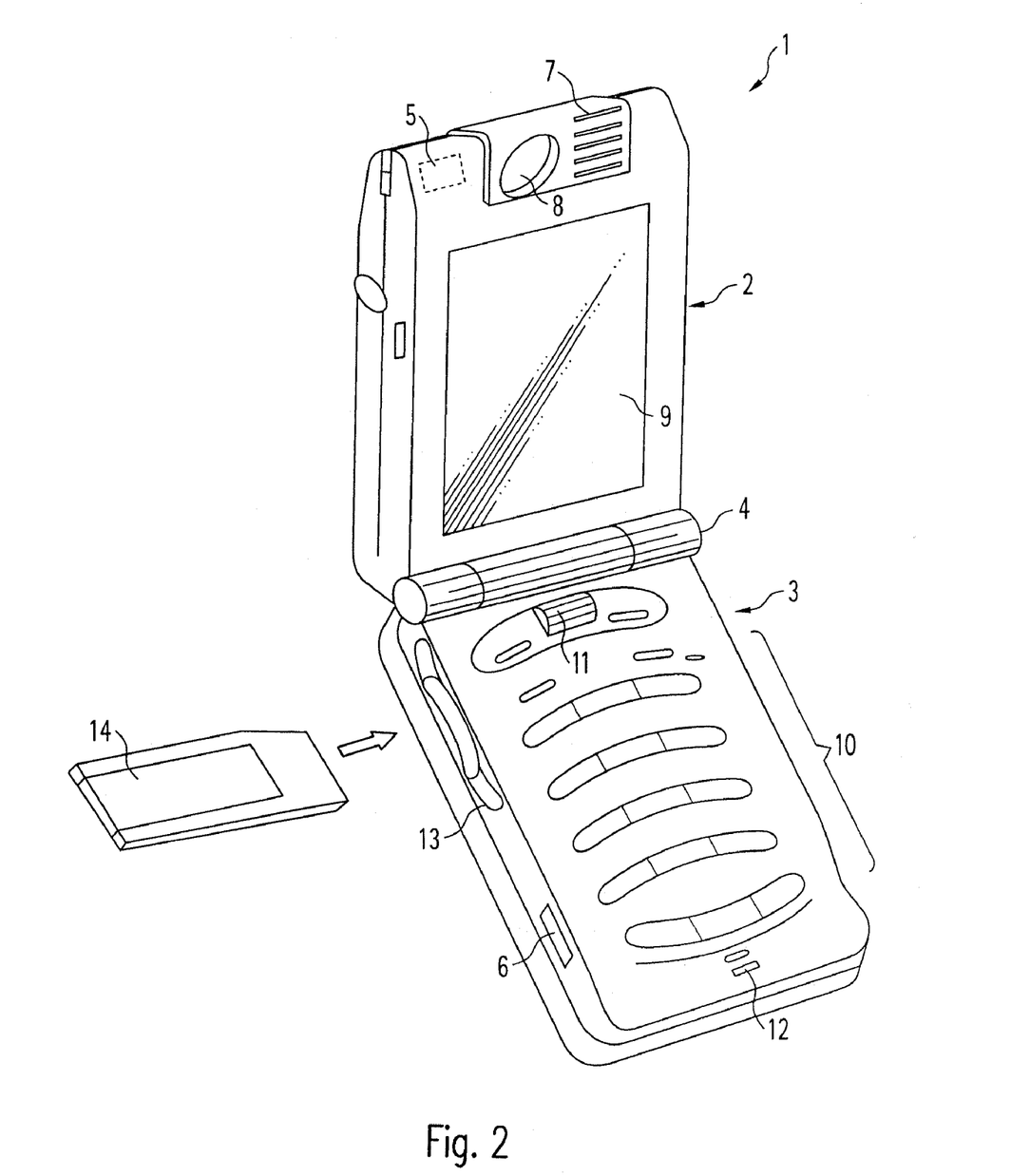
FIG. 2 shows schematically an example mobile phone according to the present invention.

FIG. 2 shows schematically an example mobile phone according to the present invention. As shown in FIG. 2, the mobile phone 1 comprises a first part 2 and a second part 3 connected by a hinge 4 interposed therebetween. Communications are established wirelessly with a base station or other devices (not shown) via the antenna 5 or via the Bluetooth™ interface 6. A speaker 7 and a digital camera 8 are installed above the display 9 in the first part 2. The second part 3 includes operation keys 10, a jog dial 11, a microphone 12, and a memory stick slot 13 that accommodates a removable Memory Stick (trademark) 14. The Memory Stick 14 is made up of flash memory elements comprising a nonvolatile memory EEPROM (Electrically Erasable and Programmable Read Only Memory) housed in a small, thin plastic case. A 10-pin plug allows various kinds of data such as videos, voice and sounds to be written to and read from the inserted Memory Stick. A battery pack (not shown) is attached to the back of the first part 2.

Figure 3:
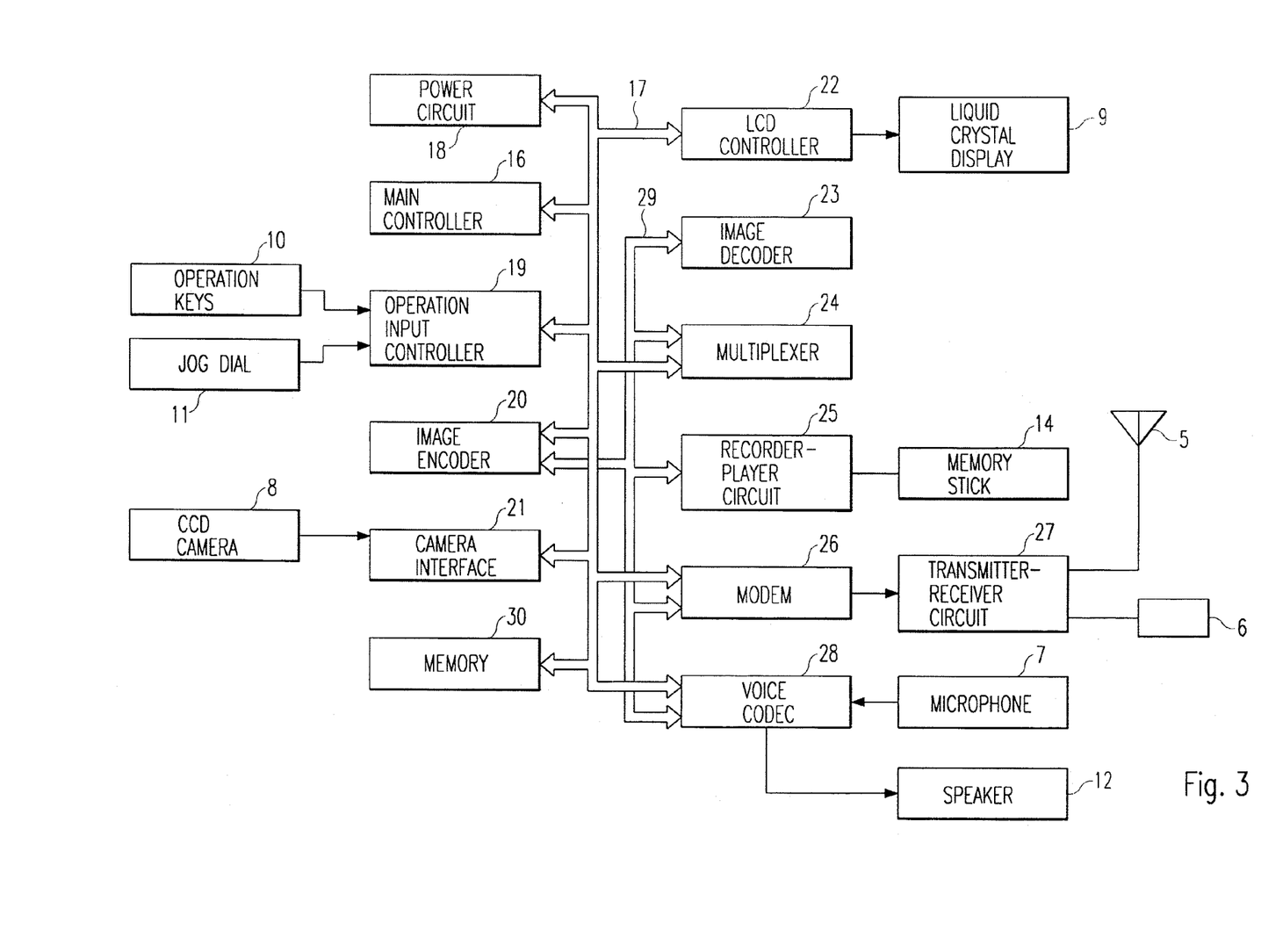
FIG. 3 shows a block diagram illustrating schematically the elements of the mobile phone shown in FIG. 2.

FIG. 3 shows a block diagram illustrating schematically the elements of the mobile phone shown in FIG. 2. As shown in FIG. 3, the mobile phone 1 includes a main controller 16 connected via a main bus 17 with a power circuit 18, an operation input controller 19, an image encoder 20, a camera interface 21, an LCD (Liquid Crystal Display) controller 22, an image decoder 23, a multiplexer 24, a recorder/player circuit 25 which receives the Memory Stick 14, a modem 26 connected to a transmitter/receiver circuit 27, a voice codec 28 connected to the microphone 12 and the speaker 7 and a nonvolatile memory 30 for storing history data with respect to any previous video call, e.g. negotiated results. The image encoder 20, the image decoder 23, the multiplexer 24, the modem 26, the voice codec 28 and a recorder-player circuit 25 are interconnected by way of a synchronous bus 29.

In a voice call mode, a voice signal picked up by the microphone 12 is converted by the voice codec 28 into digital audio data under control of the main controller 16 constituted by a CPU (Central Processing Unit), a ROM (Read Only Memory) and a RAM (Random Access Memory). The digital audio data are subjected to spread-spectrum encoding by the modem 26 before undergoing digital-analog conversion and frequency conversion by the transmitter/receiver circuit 27. After the conversion, the data are transmitted via the antenna 5. A received signal captured by the antenna 5 is amplified and subjected to frequency conversion and analog-digital conversion. The signal thus converted is subjected to spread-spectrum decoding by the modem 26. The signal thus processed is converted to an analog voice signal by the voice codec 28 before being output by the speaker 7.

Image data are transmitted in a data communication mode, wherein image data picked up by the camera 8 are supplied to the image encoder 20 via the camera interface 21. The image encoder 20 converts the image data from the camera 8 into coded image data through suitable compression coding such as that of MPEG (Moving Picture Experts Group) 2 or MPEG4. The image data thus coded are output to the multiplexer 24. When image data are picked up by the camera 8, they may be directly displayed on the liquid crystal display 9 via the camera interface 21 and LCD controller 22.

Any voice picked up by the microphone 12 during picture-taking by the camera 8 is sent as digital audio data to the multiplexer 24 via the voice codec 28. The multiplexer 24 multiplexes the coded image data from the image encoder 20 and the audio data from the voice codec 28 in accordance with a specific method. The resulting multiplexed data are subjected to spread-spectrum coding by the modem 26 before undergoing digital-analog conversion and frequency conversion by the transmitter-receiver circuit 27. The data thus converted are transmitted via the antenna 5.

Also in the data communication mode, data representing a moving picture are transmitted and received, wherein moving picture data picked up by the camera 8 or moving picture data contained in the moving picture file derived from the simple-format website are supplied through the LCD controller 22 to the liquid crystal display 9 for playback.

In addition to the transmission of image data picked up by the camera 8 or videos recorded on the Memory Stick 14 in a video call, with the mobile phone 1, the user can play back audio and video signals recorded on the Memory Stick 14, record video signals supplied from the camera 8 and roam the Internet via a Mini-web browser (not shown), execute various programs for word processing, address administration etc., wherein the user issues various commands for controlling the above processes and applications by manipulating the operation keys 10 and the jog dial 11.

During the first video call between two mobile phones according to the present invention the negotiated capabilities are stored in the memory 30 of the mobile phone 1, wherein the subscriber number is used as a key. Thus, every time a new party is called via video call, the main controller 16 stores the negotiated capabilities of the video call in the memory 30. In this way, a list is generated. Further the H.245 vendor information can be also stored in the memory 30. The vendor information is used to guarantee that the subscriber number is used along with the same mobile phone as when the data was stored.

Figure 4:
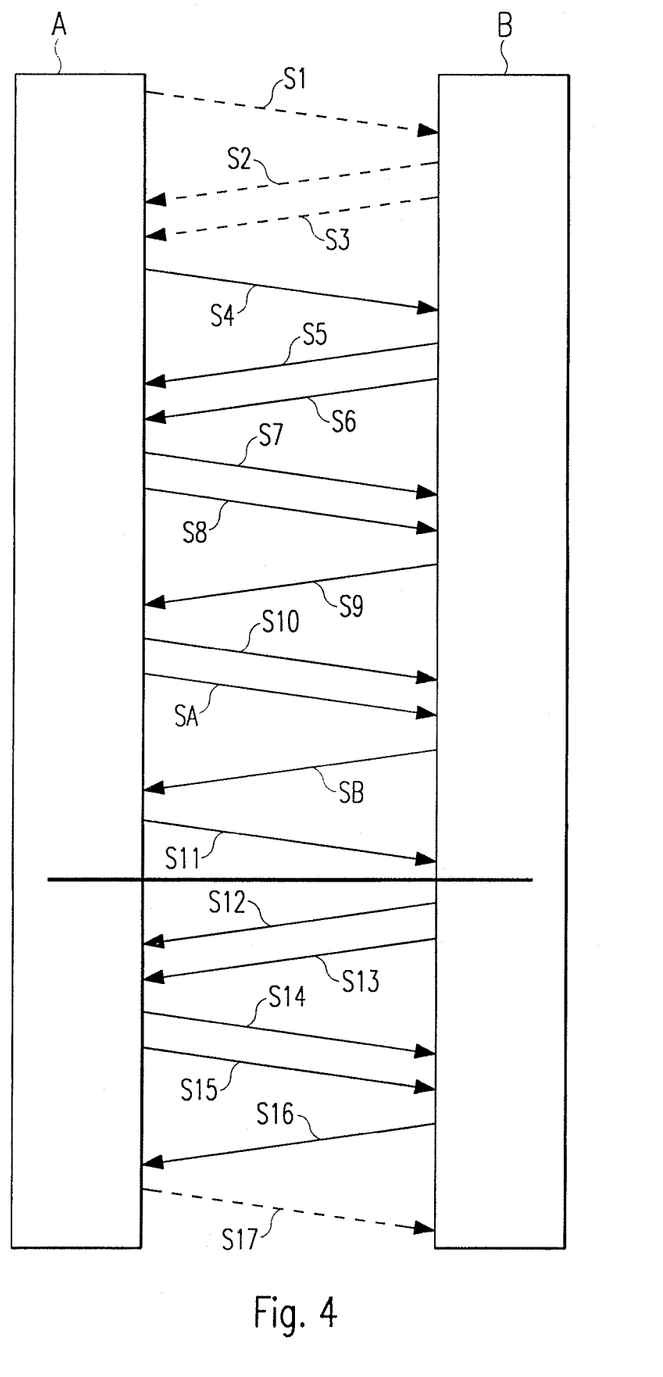
FIG. 4 shows a signal diagram illustrating an example set-up for a first video call between two mobile phones according to the present invention.

FIG. 4 shows a signal diagram illustrating an example set-up for a first video call between two mobile phones (terminals A and B) according to the present invention. It should be noted that the terminals A and B shown in FIG. 4 have the configuration shown in FIG. 3. In the diagram, the same steps as those described above with reference to FIG. 1 are indicated by the same reference numerals and thus, their descriptions are omitted. As shown in FIG. 4, after the msDetConfirm message is sent from terminal A in step S10, terminal A sends a storeVCFSValues command for storing the Video Call Fast Start Values in step SA. In step SB terminal B sends an acknowledge (storeVCFSValuesAck) or a Reject (storeVCFSValuesReject) are sent from terminal B. When terminal A receives the storeVCFSValuesAck, terminal A is informed that terminal B is ready to use the VCFSValues (negotiated result) in the next video call with respect to terminal A, and terminal A stores the VCFSValues.

Figure 5:
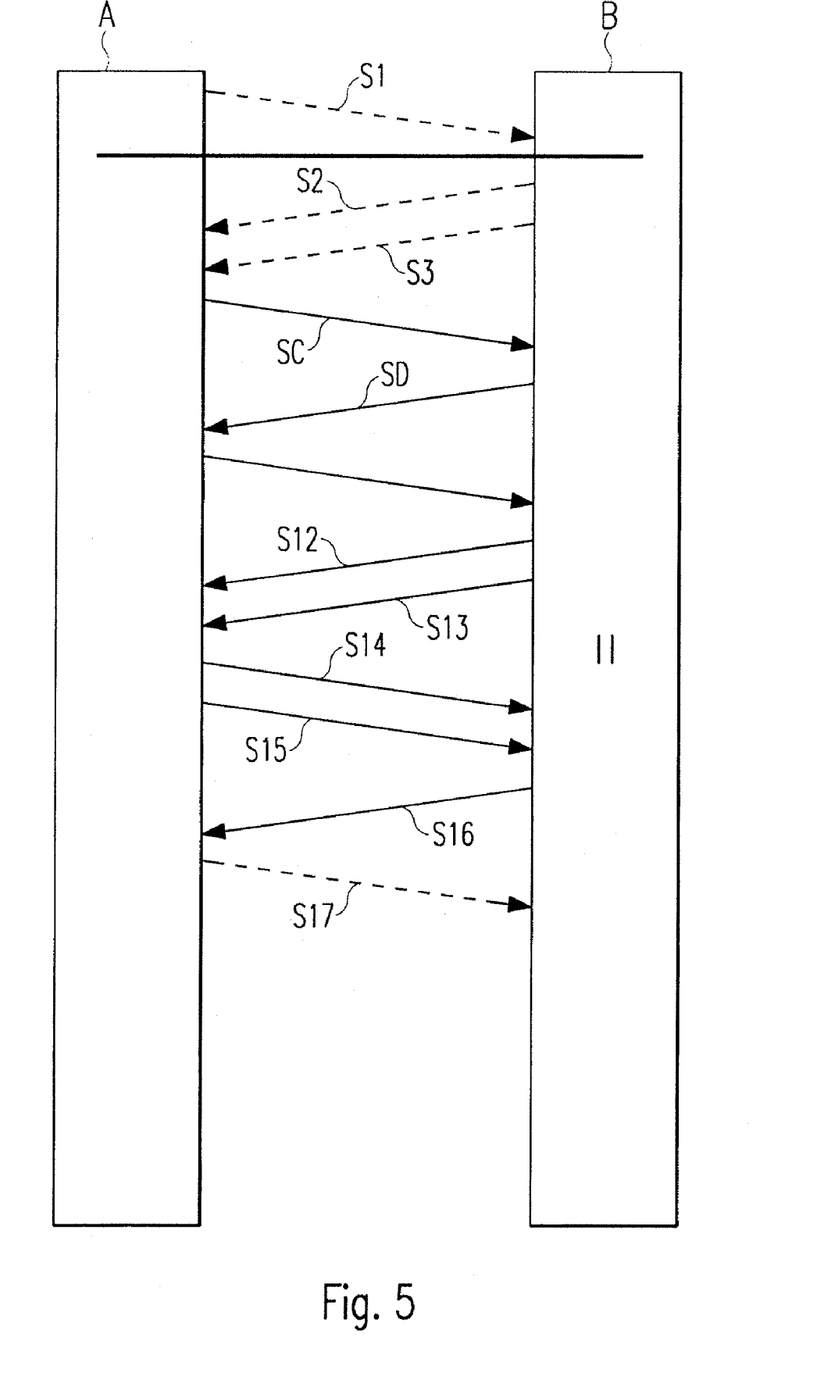
FIG. 5 shows a signal diagram illustrating an example set-up for a second video call between two mobile phones according to the present invention.

By storing the negotiated result on each terminal no further negotiation is necessary in the following video calls between the terminals A and B. The calling terminal (A or B) can start its camera 8 and load its codecs during the calling phase and the receiving terminal can do it after receiving the set-up message from the network (not shown). FIG. 5 shows a signal diagram illustrating an example set-up for the second video call between terminal A and B according to the present invention. In the diagram, the same steps as those described above with reference to FIGS. 1 and 4 are indicated by the same reference numerals and thus, their descriptions are omitted. As shown in FIG. 5, when the call is accepted in step S3 a short check, in which a useVCFSValues message is sent from terminal A in step and a useVCFSValuesAck message is sent from terminal B in step SD, will be performed to have an agreement if the stored negotiated result shall be used. Since no capabilities need to be negotiated this process is insignificant to call set-up time. After agreement of using stored capabilities, the call can start right away. This will most likely take around one second.

The commands needed to achieve the video call fast start functionality may be implemented as a so called NonStandardMessage's in the ITU's H.245 control protocol for multimedia communication. This protocol is already a part of the 3G-324M standard used in the video telephony. The useStoredValues message may be implemented as a NonStandardMessage in the H.245 RequestMessage. When the request for using stored values is sent a confirmation from the other party may be implemented by adding a NonStandardMessage to the H.245 ResponseMessage namely useStoredValuesAck.

Figure 6:
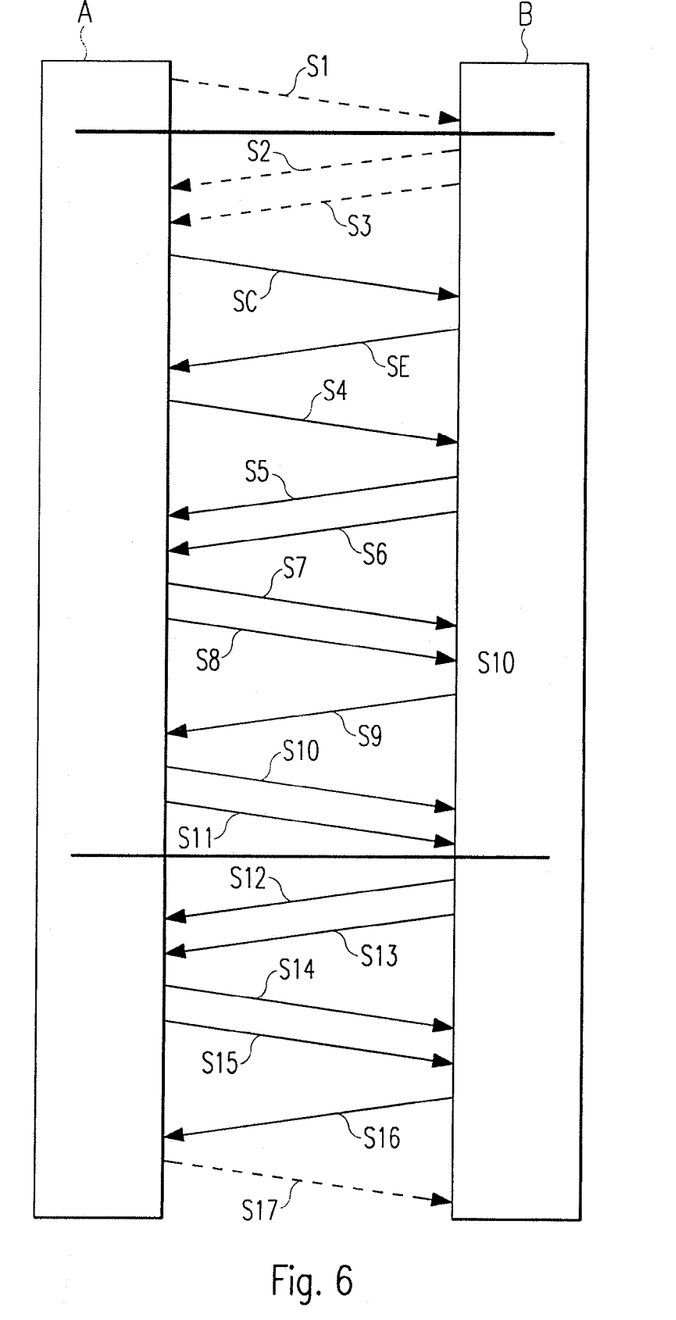
FIG. 6 shows a signal diagram illustrating an example set-up for a video call between two mobile phones in which the called mobile phone can not support the video call fast start according to the present invention.

But there is a need for the other party to reject the request, even in the case stored values can not be read or similar. FIG. 6 shows a signal diagram illustrating an example set-up for a video call between the terminals A and B in which the called terminal B can not read the stored values for the video call fast start according to the present invention. In the diagram, the same steps as those described above with reference to FIGS. 1, 4 and 5 are indicated by the same reference numerals and thus, their descriptions are omitted. As shown in FIG. 6, terminal A sends a useVCFSValues message in step SC. As terminal B can not read the stored values, terminal B sends a useVCFSValuesReject message instead of useVCFSValuesAck (cf. FIG. 5). In this case, the set-up is continued by the steps S4 to S17 like FIG. 1. The useVCFSValuesReject message may be added as a NonStandardMessage to the response message. On the other hand, if the terminal does not understand the VCFS command or any other command really, the standard says that the client shall respond with a H.245 FunctionNotUnderstood message.

As described above, every time a new party is called via video call, the negotiation is performed (FIG. 4) and the main controller 16 stores the negotiated results of the video calls in the memory 30 for the following video calls. In this way, a data base is created. According to a further embodiment of the present invention, when the mobile phone 1 is connected, for example, via the Bluetooth™ interface 6, to an other mobile phone negotiation between the mobile phone 1 and the other mobile phone (not shown) can be performed, wherein the negotiated result is stored in the data base.

Further, when the main controller 16 detects that the other mobile phone of the same type having similar qualities is connected via the Bluetooth™ interface 6, the main controller 16 compares the entries (subscriber numbers) of the telephone book of the mobile phone 1 and the entries of the telephone book of the other mobile phone. If there are corresponding entries, the main controller 16 access the data base of the other mobile phone and checks whether there are corresponding negotiated results in its base to these entries. If so, the main controller 16 checks whether the negotiated results are present in the data base stored in the memory 30 and, if not so, updates the data base stored in the memory 30. In this way, only negotiated results which are relevant for the user of the mobile phone 1 are stored in the memory 30. Further, the negotiation has not to be performed in the first video call, if the negotiated result are present in the data base.

It is to be noted that the steps of the Call Fast Start according to the present invention can be implemented in any kind of suitable hardware and/or software structure. For example, the steps of detecting a signal to establish a video call via a communication link, determining the party to which the video call has to be established, searching, in a data base, for information indicating the capability of the party with respect to the video call, defining, for the communication device, specifications for the video call based on said information; and initialling the communication device according to the specifications could be implemented as a computer programme product directly loadable into an internal memory of a communication device.

The present invention is described with respect to the ITU's H.245 protocol. However, it should be noted that the present invention is not restricted to this but also can be applied to other video communication systems advantageously.

The invention claimed is:

1. Electronic equipment for a communication system enabling video calls, comprising
   detecting means for detecting a signal to establish a video call via a communication link;
   determining means for determining a party to which the video call has to be established;
   means for searching, in a database, for information indicating the capability of said party with respect to the video call;
   means for defining, for the electronic equipment, specifications for said video call based on said information;
   means for initialling the electronic equipment according to said specifications; and
   said electronic equipment being configured to transmit, during establishment of the video call, a usage command requesting the party to use a stored negotiated result of a previous video call, and
   to selectively transmit electronic equipment information on capabilities of the electronic equipment to said party if a response to said usage command received from said party indicates that said party rejects the request to use the stored negotiated result.

2. Electronic equipment according to claim 1, further comprising means for updating said database, wherein said database includes a list of recipient data with respect to previous communications, which indicates recipient addresses, transmission methods and types of the transmitted information content.

3. Electronic equipment according to claim 2, further comprising means for acquiring recipient data from another communication device, wherein said updating means is adapted to update said database based on the acquired recipient data.

4. Electronic equipment according to claim 1, wherein said communication system is a wireless communication system and said electronic equipment is a mobile radio terminal.

5. Electronic equipment according to claim 1, wherein said communication system is a wireless communication system and said electronic equipment is a mobile phone.

6. A method for an electronic equipment enabling video calls in a communication system, comprising the steps of:
   detecting a signal to establish a video call via a communication link;
   determining a party to which the video call has to be established;
   searching, in a database, for information indicating the capability of said party with respect to the video call;
   defining, for the electronic equipment, specifications for said video call based on said information;
   initialling the electronic equipment according to said specifications;
   transmitting, during establishment of the video call, a usage command requesting the party to use a stored negotiated result of a previous video call,
   whereby electronic equipment information on capabilities of the electronic equipment is selectively transmitted to said party if a response to said usage command received from said party indicates that said party rejects the request to use the stored negotiated result.

7. A method according to claim 6, further comprising a step of updating said database, wherein said database includes a list of recipient data with respect to previous communications, which indicates recipient addresses, transmission methods and types of the transmitted information content.

8. A method according to claim 7, further comprising a step of acquiring recipient data from another communication device, wherein in said updating step said database is updated based on the acquired recipient data.

9. Computer program product directly loadable into the internal memory of a communication device enabling video calls in a wireless communication system, comprising software code portions for performing the method steps of claim 6 when said product is run in said communication device.

* * * * *

UNITED STATES PATENT AND TRADEMARK OFFICE
CERTIFICATE OF CORRECTION

PATENT NO. : 8,279,255 B2
APPLICATION NO. : 11/915028
DATED : October 2, 2012
INVENTOR(S) : Emil Hansson Page 1 of 1

It is certified that error appears in the above-identified patent and that said Letters Patent is hereby corrected as shown below:

On the title page item [75]: "Inventor: Emil Hansson, Melmö (SE)" should read –
"Inventor: Emil Hansson, Malmö (SE)"

Signed and Sealed this
Fourth Day of December, 2012

David J. Kappos
*Director of the United States Patent and Trademark Office*